United States Patent
Nevstruev et al.

(10) Patent No.: US 9,003,544 B2
(45) Date of Patent: Apr. 7, 2015

(54) EFFICIENT SECURING OF DATA ON MOBILE DEVICES

(75) Inventors: Sergey V. Nevstruev, Moscow (RU);
Oleg V. Nevstruev, Moscow (RU);
Andrey V. Matveev, Moscow (RU)

(73) Assignee: Kaspersky Lab ZAO, Moscow (RU)

(*) Notice: Subject to any disclaimer, the term of this patent is extended or adjusted under 35 U.S.C. 154(b) by 77 days.

(21) Appl. No.: 13/190,853

(22) Filed: Jul. 26, 2011

(65) Prior Publication Data

US 2013/0031595 A1    Jan. 31, 2013

(51) Int. Cl.
*G06F 21/62* (2013.01)
*G06F 21/88* (2013.01)
*G06F 21/55* (2013.01)
*G06F 21/60* (2013.01)
*H04L 29/06* (2006.01)

(52) U.S. Cl.
CPC .......... *G06F 21/6245* (2013.01); *G06F 21/554* (2013.01); *G06F 2221/2107* (2013.01); *G06F 21/6209* (2013.01); *G06F 21/55* (2013.01); *G06F 21/88* (2013.01); *G06F 21/602* (2013.01); *G06F 21/6218* (2013.01); *H04L 63/20* (2013.01); *G06F 21/552* (2013.01); *G06F 21/60* (2013.01)

(58) Field of Classification Search
USPC .......................................................... 726/35
See application file for complete search history.

(56) References Cited

U.S. PATENT DOCUMENTS

| | | | |
|---|---|---|---|
| 6,088,803 A | 7/2000 | Tso | |
| 6,804,780 B1 * | 10/2004 | Touboul | ........................ 713/181 |
| 7,020,895 B2 | 3/2006 | Albrecht | |
| 7,188,367 B1 | 3/2007 | Edwards | |
| 7,373,389 B2 | 5/2008 | Rosenbaum | |
| 7,392,544 B1 | 6/2008 | Pavlyushchik | |
| 7,478,420 B2 | 1/2009 | Wright | |
| 7,631,359 B2 | 12/2009 | Cabrera | |
| 7,673,347 B2 | 3/2010 | James | |
| 7,783,281 B1 | 8/2010 | Cook | |

(Continued)

FOREIGN PATENT DOCUMENTS

| | | |
|---|---|---|
| CN | 1980429 | 6/2007 |
| CN | 101325767 | 12/2008 |

(Continued)

OTHER PUBLICATIONS

European Search Report from European Application No. EP11181540 dated Feb. 27, 2013.

*Primary Examiner* — Alexander Lagor
(74) *Attorney, Agent, or Firm* — Patterson Thuente Pedersen, P.A.

(57) ABSTRACT

A mobile device and associated method and computer-readable medium, wherein the device is configurable for data protection readiness. A preparation module is configured to perform preprocessing to prepare the mobile device for data protection readiness, the preprocessing includes: indicating certain items of data stored in the data storage arrangement which are of personal importance to an owner of the mobile device; indicating criteria that defines a situation for which the items of data of personal importance are to be secured; and indicating a set of actions to be carried out to secure the items of data of personal importance. A protection module is configured to monitor for an occurrence of the situation for which the items of data of personal importance are to be secured based on the criteria indicated by the preparation module, and to execute the set of actions indicated by the preparation module in response to a detection of the occurrence of the situation.

28 Claims, 7 Drawing Sheets

(56) References Cited

U.S. PATENT DOCUMENTS

| | | |
|---|---|---|
| 7,788,235 B1 | 8/2010 | Yeo |
| 8,438,630 B1 * | 5/2013 | Clifford .................. 726/13 |
| 2003/0182435 A1 | 9/2003 | Redlich |
| 2004/0153660 A1 | 8/2004 | Gaither |
| 2004/0205366 A1 * | 10/2004 | Hung et al. .................. 713/340 |
| 2004/0221174 A1 * | 11/2004 | Le Saint et al. ............... 713/201 |
| 2005/0246553 A1 | 11/2005 | Nakamura et al. |
| 2006/0075263 A1 | 4/2006 | Taylor |
| 2006/0240806 A1 * | 10/2006 | Demirbasa et al. ........ 455/412.1 |
| 2006/0277467 A1 | 12/2006 | Reponen |
| 2006/0294304 A1 | 12/2006 | Brown |
| 2007/0021112 A1 * | 1/2007 | Byrne et al. ................. 455/419 |
| 2007/0055711 A1 * | 3/2007 | Polyakov et al. ............. 707/203 |
| 2007/0180540 A1 | 8/2007 | Little |
| 2007/0207729 A1 * | 9/2007 | Chen et al. ..................... 455/15 |
| 2007/0217349 A1 * | 9/2007 | Fodor et al. ................ 370/310.2 |
| 2007/0260759 A1 * | 11/2007 | Scott ................................ 710/8 |
| 2007/0281664 A1 * | 12/2007 | Kaneko et al. ................ 455/410 |
| 2007/0294373 A1 | 12/2007 | Harrison |
| 2008/0151877 A1 | 6/2008 | Lai |
| 2009/0025090 A1 | 1/2009 | Clement et al. |
| 2009/0106845 A1 | 4/2009 | Li |
| 2009/0126022 A1 * | 5/2009 | Sakaki .......................... 726/25 |
| 2010/0005509 A1 | 1/2010 | Peckover |
| 2010/0127216 A1 | 5/2010 | Yao et al. |
| 2010/0162347 A1 * | 6/2010 | Barile .............................. 726/1 |
| 2010/0211716 A1 | 8/2010 | Chen |
| 2010/0251369 A1 | 9/2010 | Grant |
| 2012/0063585 A1 * | 3/2012 | Gravino et al. .......... 379/218.01 |

FOREIGN PATENT DOCUMENTS

| | | |
|---|---|---|
| CN | 101345963 | 1/2009 |
| CN | 101483861 | 7/2009 |
| CN | 101674583 | 3/2010 |
| EP | 2187330 | 5/2010 |
| KR | 2009013433 | 2/2009 |
| WO | WO03079196 | 9/2003 |
| WO | WO2006107320 | 10/2006 |
| WO | WO2008076442 | 6/2008 |
| WO | WO2008147737 | 12/2008 |
| WO | WO2009127771 | 10/2009 |
| WO | WO2010127216 | 11/2010 |
| WO | WO2010127455 | 11/2010 |

* cited by examiner

| Critical Information | |
|---|---|
| Contact 2<br>Application 3 | 310 |

| Important Information | |
|---|---|
| Contact 1<br>Contact 3<br>Data 1 | 320 |

| ordinary Information | |
|---|---|
| Data 2<br>Data 3<br>Application 1<br>Application 2 | 330 |

FIG. 6

EFFICIENT SECURING OF DATA ON MOBILE DEVICES

FIELD OF THE INVENTION

The invention relates generally to information processing and, more particularly, to secure management of personal data on mobile devices.

BACKGROUND OF THE INVENTION

The problem of maintaining privacy and safety of user data is particularly prevalent nowadays. Data can be stored on desktop PCs or servers, and in those cases, data protection can be provided through traditional mechanisms of data loss prevention (DLP), such as the use of encryption systems, data backup, or file shredders which permanently remove data.

In the world of mobile devices, however, the possibility of losing or misplacing the device, leaving the device unattended, or the possibility of theft of the device, present an entirely different sort of challenge. In these cases, the user is not able to fully prevent the device itself (containing personal and often very important data) from falling into the wrong hands.

Application of conventional DLP approaches to mobile devices is further complicated because the devices themselves have much less computing capacity than PCs. Mobile devices are battery-powered, and are often optimized for energy efficiency. A data protection system must therefore present a minimal burden to users, operate efficiently to preserve processor and memory capacity in the mobile device for system resources and user applications, and avoid presenting a significant resource drain resulting in high energy utilization. Conventional DLP approaches such as system-wide deployment of file encryption would require extra processing overhead of encryption, decryption, or both, each time data is to be written, accessed, or modified.

SUMMARY OF THE INVENTION

One aspect of the invention is directed to a mobile device, such as a smartphone, tablet, sub-notebook or netbook, for instance, configurable for data protection readiness. The device generally includes a computing system having a power system with an on-board energy source, and a processor operatively coupled with a data storage arrangement and a network interface. The computing system includes a preparation module and a protection module. The preparation module is configured to perform preprocessing to prepare the mobile device for data protection readiness. The preprocessing includes: indicating certain items of data stored in the data storage arrangement which are of personal importance to an owner of the mobile device; indicating criteria that defines a situation for which the items of data of personal importance are to be secured; and indicating a set of actions to be carried out to secure the items of data of personal importance. The protection module is configured to monitor for an occurrence of the situation for which the items of data of personal importance are to be secured based on the criteria indicated by the preparation module, and to execute the set of actions indicated by the preparation module in response to a detection of the occurrence of the situation.

A method for preparing a mobile device for data protection readiness according to another aspect of the invention includes (a) storing instructions in the mobile device for causing the mobile device to (i) indicate certain items of data stored on the mobile device which are of personal importance to an owner of the mobile device; (b) storing instructions in the mobile device for causing the mobile device to (ii) indicate criteria that defines a situation for which the items of data of personal importance are to be secured; (c) storing instructions in the mobile device for causing the mobile device to (iii) indicate a set of actions to be carried out to secure the items of data of personal importance; (d) storing instructions in the mobile device for causing the mobile device to (iv) monitor for an occurrence of the situation for which the items of data of personal importance are to be secured based on the criteria; and (e) storing instructions in the mobile device for causing the mobile device to (v) execute the set of actions in response to a detection of the occurrence of the situation.

In another aspect, the invention is directed to a computer-readable medium containing instructions for preparing a mobile device for data protection readiness. The computer-readable medium may comprise one or more distinctly-identifiable devices, which include: instructions for causing the mobile device to (i) indicate certain items of data stored on the mobile device which are of personal importance to an owner of the mobile device; instructions for causing the mobile device to (ii) indicate criteria that defines a situation for which the items of data of personal importance are to be secured; instructions for causing the mobile device to (iii) indicate a set of actions to be carried out to secure the items of data of personal importance; instructions for causing the mobile device to (iv) monitor for an occurrence of the situation for which the items of data of personal importance are to be secured based on the criteria; and instructions for causing the mobile device to (v) execute the set of actions in response to a detection of the occurrence of the situation.

Advantageously, various embodiments of the invention operate to secure data items which are specifically important to the owner of the mobile device. These data items are secured in response to a detected situation in which the mobile device is believed to be at particular risk for data loss or exposure of sensitive data, such as theft or misplacement of the device. The actions taken to secure the important data items can be based on the nature of the situation of the mobile device, the nature of the data item, the importance of the data item to the owner, the operational status and computational capacity of the mobile device, and other configurable parameters. This approach is particularly well-suited to individual mobile devices since the bulk of the processing for enabling the important data to be secured can be performed in advance, and, in certain implementations, with the benefit of externally-managed and up-to-date knowledge base(s) of general importance-determining criteria and data securing best practices. Other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention are intended for use in any mobile computing device with the ability to process both text data and image data. These may be smart phones, personal digital assistants (PDAs), ultra-mobile personal computers (UMPCs), interne tablets, and the like.

Figure 1:
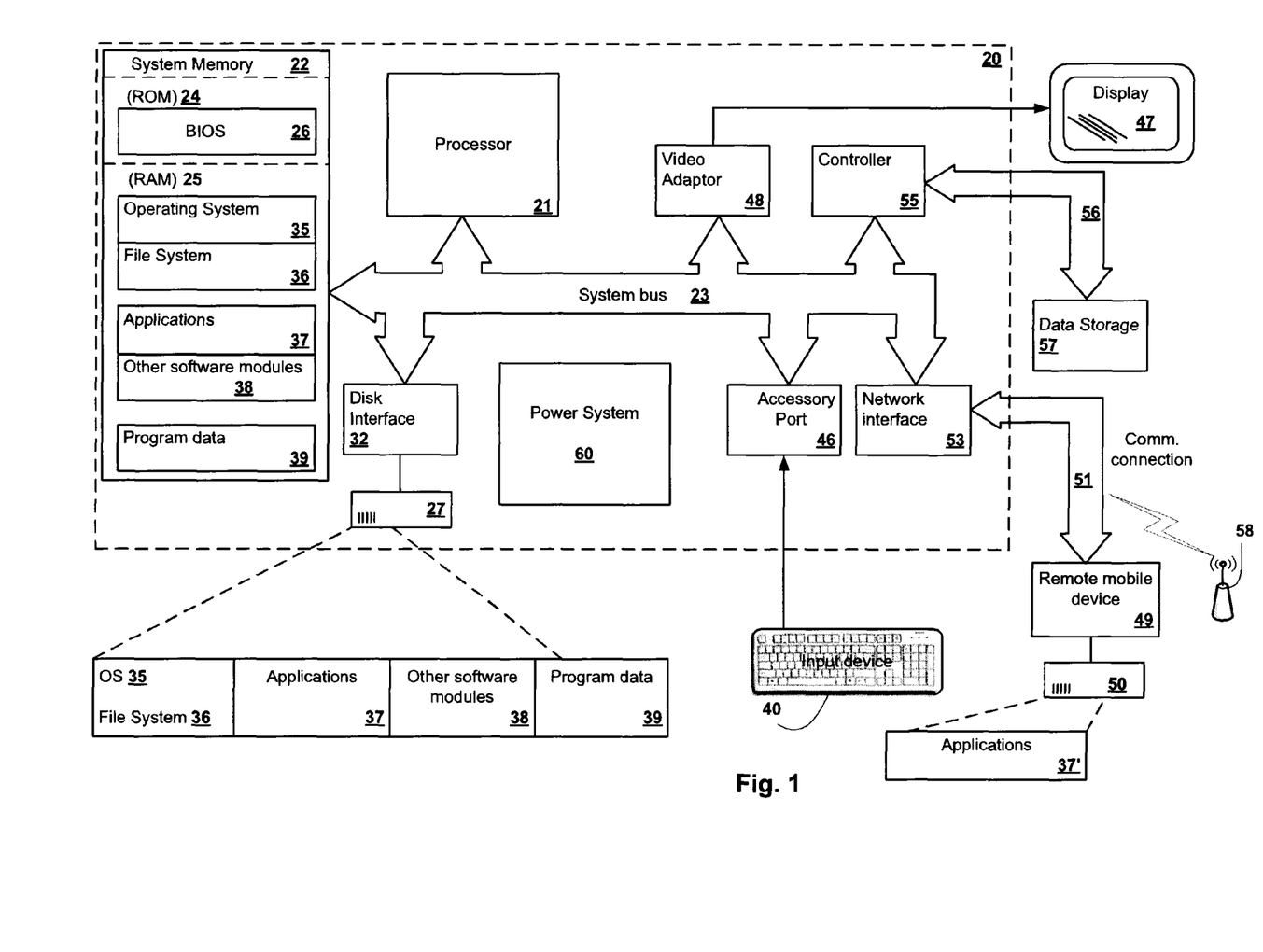
FIG. 1 is an example of a system of a general-purpose mobile device, upon which the present invention may be implemented according to various embodiments.

FIG. 1 is an example of a system of a general purpose mobile device 20 comprising a computing system that includes processor 21, system memory 22 and system bus 23, which contains various system components, including memory associated with processor 21. These components are implemented in hardware using suitable circuitry. System bus 23 is implemented as any conventional bus structure including a memory bus or memory controller, a peripheral bus, and a local bus, which can interact with any other bus architecture. System memory includes read only memory (ROM) 24, random-access memory (RAM) 25, basic input/output system (BIOS), containing the basic procedures that ensure the transfer of information between the elements of the mobile device 20, for example, at boot time, using the ROM 24.

Mobile device 20 further includes a non-volatile storage 27 (such as a Flash EEPROM device or hard disk drive, for example, which can include either removable or non-removable media) for reading and writing information. Non-volatile storage 27 is connected to the system bus 23 via the disk interface 32. Non-volatile storage 27 is used to store computer instructions, data structures, program modules and other code or data of the mobile device 20.

Mobile device 20 can further access removable data storage 57 via controller 55 which in turn is interfaced via system bus 23. Terms such as "computer-readable medium," "machine-readable storage media," "data storage arrangement," and the like, are meant to encompass devices such as non-volatile storage 27, system memory 22, and data storage 57.

Some of the software modules, such as an operating system 35 are stored on non-volatile storage 27, ROM 24 or RAM 25. Mobile device 20 has a file system 36, in which are stored an operating system 35 and additional software applications 37, other program modules 38 and program data 39.

The user is provided the ability to enter commands and information into mobile device 20 through the input device 40, such as a keyboard, touchscreen, or microphone and associated analog-to-digital circuitry, for instance, or any combination thereof. Input device 40 can be interfaced with processor 21 via system bus 23 through accessory port 46. Accessory port 46 can be implemented as a serial port such as a USB port, for instance, or a wireless personal area network (PAN) interface such as a Bluetooth® wireless interface. Alternatively, for built-in input devices, input device 40 can be interfaced directly to system bus 23. A display 47 is coupled to processor 21 via system bus 23 and an interface such as a video adapter 48.

Mobile device 20 can operate in a networked environment, using communicative connection 51 established via network interface 53 to a wireless access point, one or more remote mobile devices 49, or to mobile network infrastructure 58. Communicative connection 51 may be implemented via GSM™, CDMA, UMTS™, WiFi®, WIMAX®, LTE™, IMT-Advanced™ standards, and other mobile communication standards, or any combination thereof. Remote mobile device (or devices) 49 may be smartphones, PDAs, UMPCs, tablets, or the like, which generally have most or all of the components described above for mobile device 20. Remote mobile device 49, as depicted, has a storage device 50, which stores applications 37' and associated data. It should be noted that these example connections are only illustrative of various configurations with which mobile devices can be interconnected.

Mobile device 20 has a power system 600 that includes an on-board energy source (such as a battery, for instance), along with power regulation circuitry for delivering power from the on-board energy source or from an external source at the appropriate voltages for use by the other circuitry. Power system 30 can also include a charging circuit for controlling delivery of externally-applied power to the battery during charging.

Figure 2:
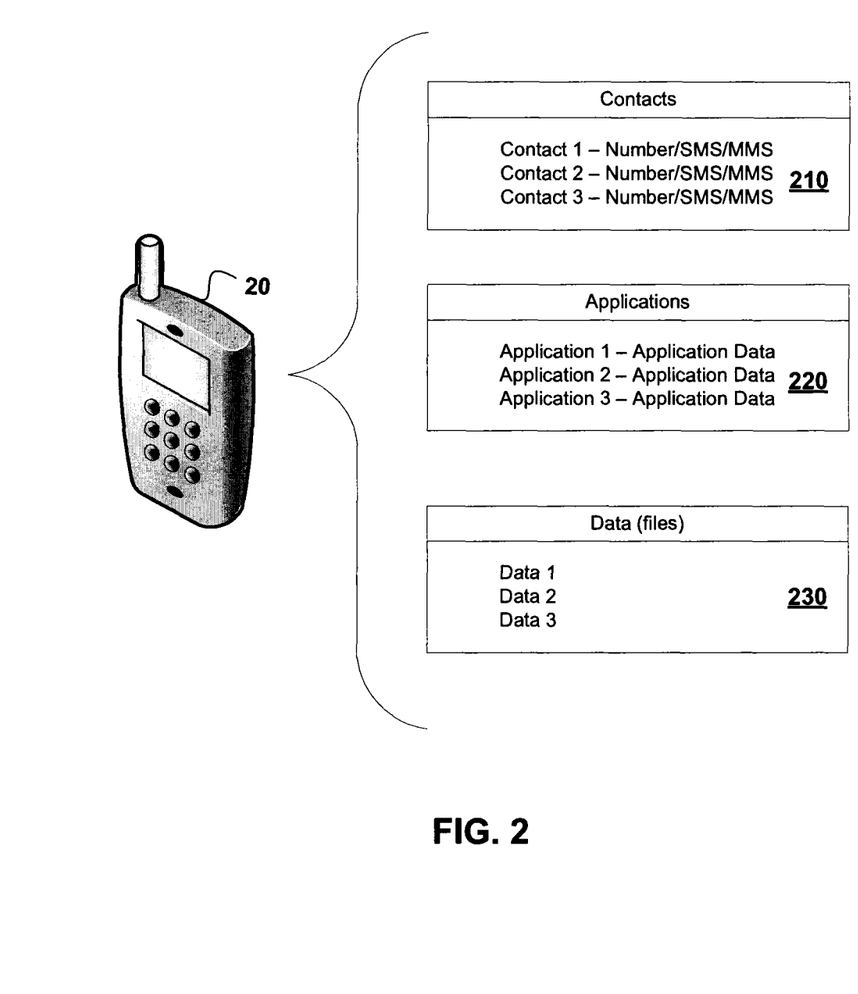
FIG. 2 illustrates various items of data kept on a mobile device such as the mobile device of FIG. 1, the items of data being organized by their type.

Referring to FIG. 2, mobile device 20 has a personal information stored on it, such as set of contacts 210. Each of contacts 210 has related SMS/MMS message records. Also stored on mobile device 20 are applications 220, each application having a corresponding set of application data, which may be personal to the owner, or primary user, of mobile device 20. Further, mobile device 20 stores data 230, which may be organized in its file system as files containing various items of information. Data 230 may also be personal to the owner of mobile device 20. As used herein, the term owner refers interchangeably to the owner, or to the primary user, of the mobile device. Most often, the owner is also the primary user; however, in cases where the device is owned by an employer or non-user of the device, it is the primary user's personal data which must be protected. Thus, for the sake of simplicity, the primary user will also be referred to hereinafter as simply the owner.

For each individual owner of a corresponding mobile device 20, the various types of data stored on the mobile device may have different degrees of importance to the owner. For example, to one owner it may be very important to keep information about their contacts (call history, messages, etc.), whereas another owner might be primarily interested in the integrity of the data associated with a web browser or email client. There are different types of applications, such as scheduling and accounting systems, e.g., MyLife Organized, Pocket Informant, MoneyHarp, SmartOrganizer, SPB Finance, and the like, which can be used to store items of various personal information including bank account information. Such information is clearly of utmost importance to the owner and must be kept strictly confidential. If the owner loses his or her mobile device, or—even worse—if the device is stolen, the criticality of protecting these applications and their data becomes particularly urgent. Owners may also wish to hide certain contacts, along with their corresponding history of calls and text messages, or data files that are stored on their mobile devices as they may also contain confidential data.

Figure 3:
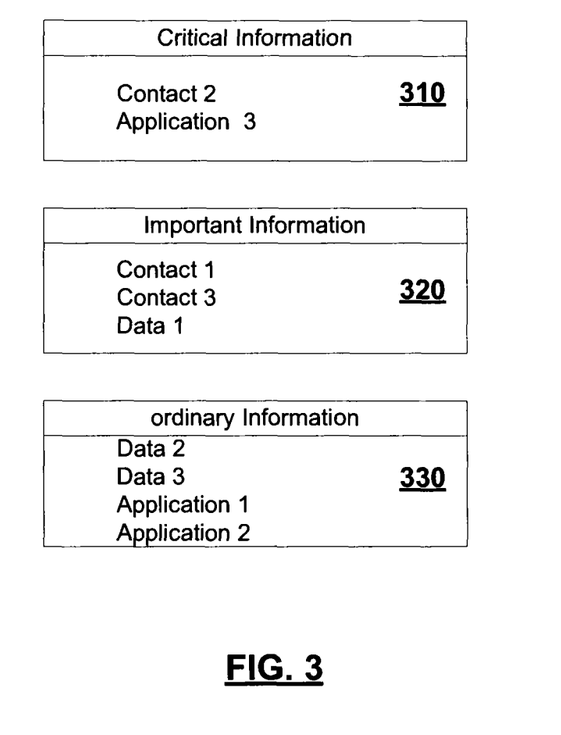
FIG. 3 illustrates an example of a relative importance classification for some of the data items kept on the mobile device of FIG. 2 according to one embodiment.

FIG. 3 is a diagram illustrating the data types of FIG. 2, along with corresponding exemplary indicia of relative importance to an exemplary particular owner. In this example, Contact 2 and Application 3 are regarded by the owner as being of critical importance. Thus, Contact 2 and Application 3 are deemed strictly private and must not be accessible to third parties. For these critically-important items of data, the most stringent rules for concealment are applicable. Next is important information 320, which contains Contact 1 and Contact 3 Data item 1. In this case, it is also important to the owner to hide the information related to the listed contacts and reliably maintain data item 1. The remaining information is designated as ordinary information 330, is not regarded as being of significant importance—for example, this type of information may not contain personal information, or can be easily restored in the event of loss. The embodiment of FIG. 3 exemplifies one of many possible approaches to classifying relative importance of data items stored on mobile device 20. There may be more or fewer categorizations, for example.

Figure 4:
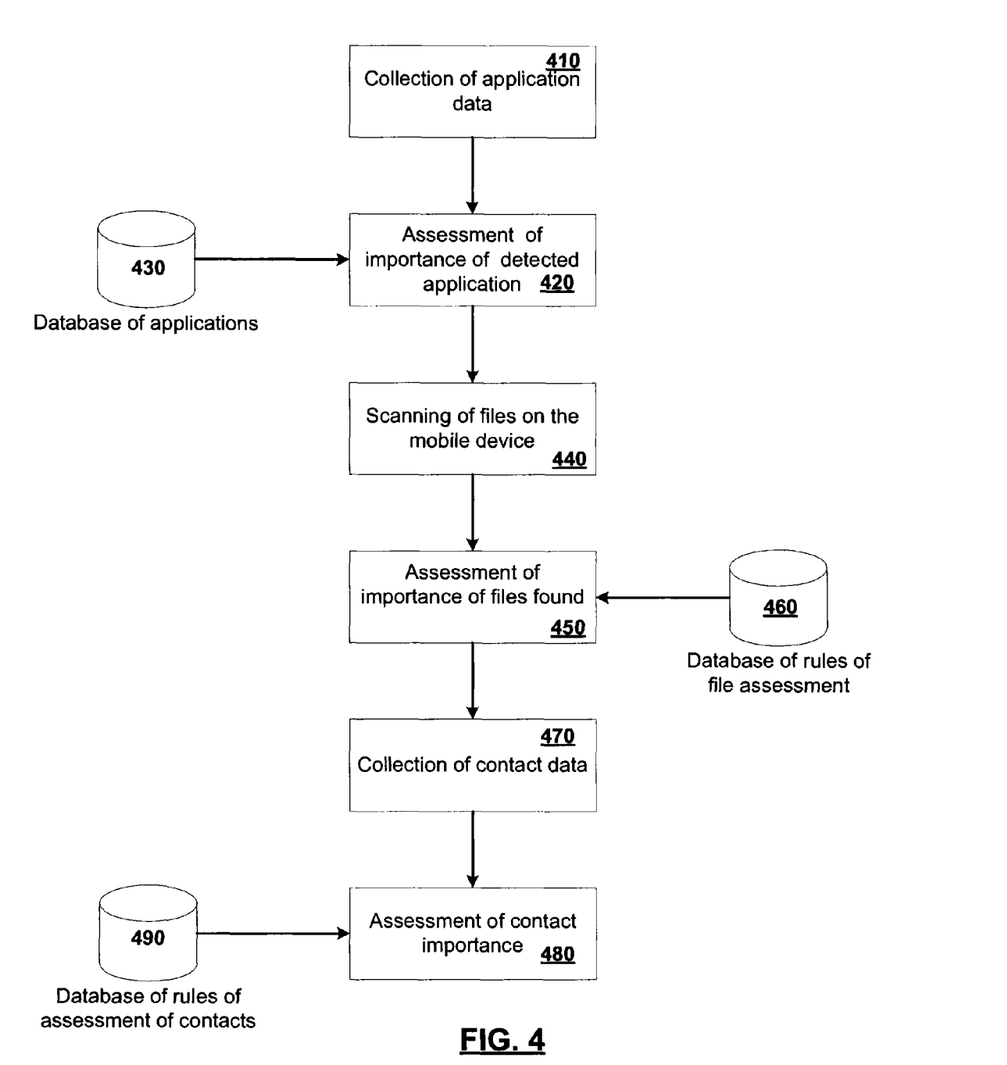
FIG. 4 illustrates a method for evaluating data on the mobile device according to assessment of its importance according to one embodiment.

FIG. 4 illustrates an exemplary method for evaluating data on the owner's mobile device according to the relative importance of each data item. In one type of embodiment, this method is carried out by an analysis module of the mobile device. At 410 a data collection operation to collect a list or set of installed applications and their usage of associated data takes place. The data collection operation may include an analysis of the file system, registry, operating system logs, etc. At 420, the evaluation of detected applications in terms of their importance to the owner takes place. Various approaches for evaluating the owner-specific importance of the detected applications are contemplated, including analyzing the absolute or relative extent of use of the application by the owner, and the nature of the use of each application. In a related approach, the various owner settings within the application are analyzed to evaluate how the owner may have configured the application.

Figure 5A:
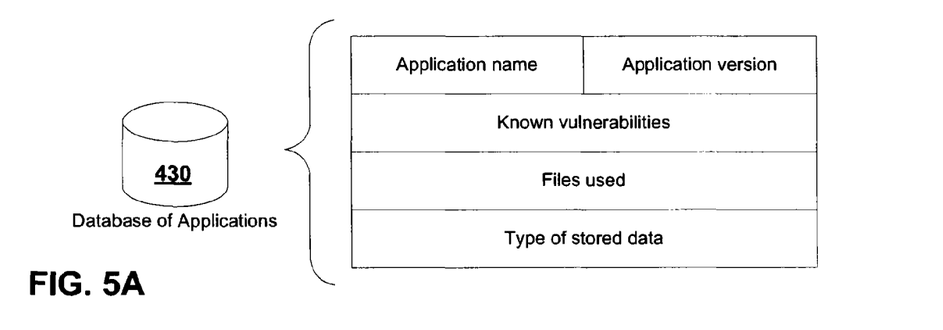
FIGS. 5A-5C illustrate examples of implementation of databases of rules for assessing applications, files, and contacts, respectively, according to embodiments of the invention.

A database of applications 430 stores predefined application-related information, and may also be utilized for storing user-specific data relating to the particular configuration or usage of each installed application. Database of applications 430 may be stored on the mobile device, or may be maintained remotely using a cloud computing model. In one embodiment, as illustrated in FIG. 5A, database of applications 430 contains records of information representing various parameters, such as the application name or other identifier, version, known vulnerabilities, data (e.g., files) used by the application, the types of stored data. In one embodiment, this information represents a general knowledge base of applications, and is not specific to the user's device configuration.

In a related embodiment, a section of database 430 or, in another implementation, a separate database (either local on the mobile device or remotely maintained), contains collected owner-specific information about installed applications, their configurations, usage history, nature of usage, and other owner-specific information relating to those applications.

In another embodiment, a separate database or database section for owner-specific information is not used. In this approach, the process of evaluating the importance of each application uses the general knowledge base of applications to determine locations (e.g., file, registry, database) where owner-specific configuration or usage-related data is stored, and the relevant items of information are looked up and assessed when they are called for.

In one example, the Opera Mini application, depending on the type of stored information (e.g., web page addresses) can be associated with different levels of importance. For instance, if the browser was used to access web sites or resources protected by password or other form of user authentication, and saved the authorization data (e.g., in a password list or a cookie), then the degree of importance of this application would be set relatively high. Similarly, if the browser had access to various social networking sites (such as Facebook or LinkedIn, which may contain personal information about the owner or other individuals), then the assigned level of importance would also be relatively high. On the other hand, if the browser's history or cache does not reflect visits to potentially sensitive sites, and instead reflects visits to publicly-accessible sites such as news, multimedia, games, and the like, the browser will be assigned a low level of importance this type of stored data does not contain any personal or sensitive information.

Referring again to FIG. 4, scanning of files stored on the storage medium of mobile device 20 takes place at 440. In the scanning, properties of the files are retrieved and examined. A suitable scanning process may be implemented using known techniques such as those employed in conventional anti-virus software tools.

Figure 5B:
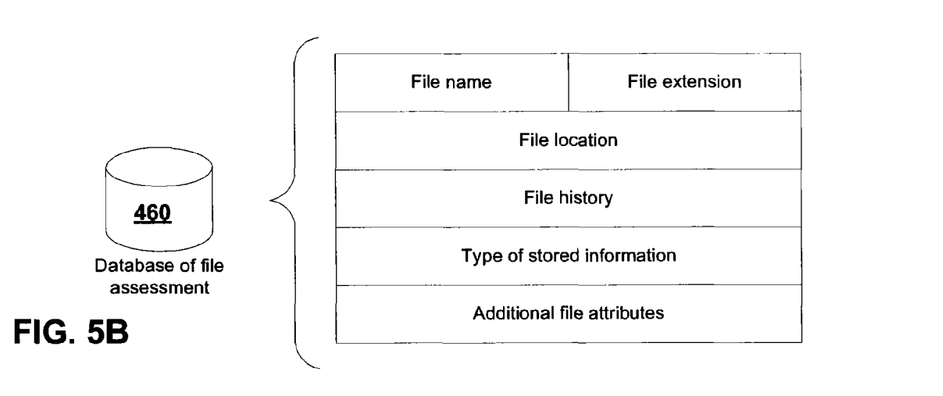

At 450, the files that are scanned are each assessed in terms of their importance to the owner based on a database of file assessment 460. An exemplary file inventory record maintained in database 460 is depicted in FIG. 5B. The various parameters, such as the file name extension, the location on the disk, the history of file access (which includes a journal of its changes), an indication of the types of stored information (e.g., text, multimedia, etc.), as well as additional attributes (e.g., encryption and packaging) are analyzed based on a rules section stored in database 460 corresponding to each of these parameters.

In one embodiment, database of file assessment 460 contains general rules pertaining to known files (such as files generated or used by well-known applications) or known types of files (e.g., based on filename extension, file structure or header information, or other known metadata embedded in the file), and represents a knowledge base of such files or file properties. This knowledge base of rules can be used to determine if a given file found on the mobile device is of a known type or used for a known purpose. The result of the evaluation is an assessment of the importance and, where ascertainable, the criticality, of the corresponding file. A few illustrative examples are presented below:

upon detection of a text file with the name login.txt in the "Personal" folder, the result of the analysis is an assignment of a high level of importance for the file;

upon detection of a file having a file extension ".Mp3" and a file location of the folder "Music," the level of importance will be set to low.

upon detection of a file located in a folder identified as a browser cache (containing saved web pages) the file's level of importance will be set to high. In this particular example, note that the criteria to assess the importance of the file includes not only the properties of the file being assessed, but also attributes of other files and folders stored in the file system near the file being assessed (e.g., in the same folder, nested beneath the folder where the file is stored, etc.).

At 470, data relating to the owner's contacts is collected. At 480, the collected contacts are each evaluated to determine their importance. To this end, a database of contact assessment 490 is utilized.

Figure 5C:
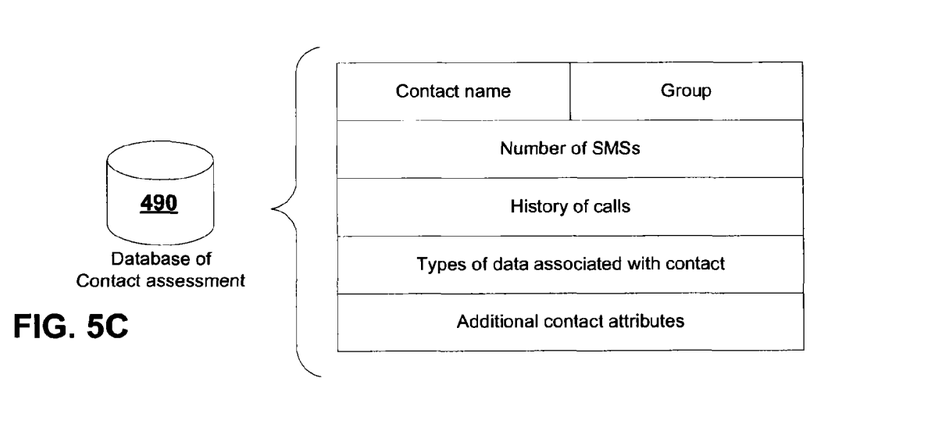

An exemplary record of database 490 is depicted in FIG. 5C. Parameters relating to the owner's usage of each contact, such as the name of the contact group in which this contact is contained, the number of messages sent and the number received, call history and other optional attributes of a contact record that may be specific to different platforms such as Windows Mobile or Symbian, or types of devices produced by various manufacturers such as HTC, Nokia or Samsung are taken into account in various embodiments.

In various embodiments, databases 430, 460, and 490 may be implemented using conventional database management systems as MySQL, PostgreSQL, InterBase, MSDE, DB2, or any other suitable database programming environment. It should be understood that the examples described above for database of applications 430, database of file assessment 460 and database of contact assessment 490 are illustrative, and may be implemented with more or fewer features, or with different combinations of features in various embodiments.

In one particular embodiment, the rules contained in these databases have a simple linguistic description, making them editable by the owners of mobile devices. Accordingly, the importance assessment accuracy may be improved with the owner's involvement.

In a related approach, an interactive user interface module presents a user-friendly control panel or step-by-step wizard program that facilitates establishing or adjusting the importance-determination rules. In one type of embodiment user-specified or user-adjusted rules are stored locally on the mobile device 20. These specific rules may be stored in a database, in a configuration file, as part of a script, or in any other suitable fashion. In this type of embodiment, databases 430, 460, and 490 provide default rules, with user-specified rules having priority over any corresponding (or conflicting) rule present in the default rule set.

In another embodiment, the user-specified or user-adjusted rules are stored remotely from mobile device 20. In this case, a cloud computing model may be employed, with the rules being stored on one or more servers, and associated with a user account to which device 20 is programmed to log in to access the rules. In a related approach, user-specified or user-adjusted rules are analyzed and aggregated by a security service provider, who may then update the default rules to better suit the contemporary needs of users.

In one embodiment, the processing blocks depicted in FIG. 4 are carried out on the hardware of mobile device 20, but the database of applications 430, the database of file assessment 460, and the database of contact assessment 490 reside remotely from device 20. In one such embodiment, the databases reside on a remote server operating under the control of a service provider due to their size and complexity. In this case, each process block involving access of a corresponding database will also include a data transfer operation to/from the remote server that hosts that database.

In one embodiment, the rules for evaluation, which are stored in databases in FIG. 5A-5C, can be defined and maintained remotely from the mobile device. For instance, the rules can be defined and maintained at a provider of information services. The service provider pre-analyzes known programs and file types.

In addition, the service provider may further gather various parameters and statistics from owners as to the importance of contacts or other objects. According to one approach for statistical analysis, if a large number of owners identify a certain contact as being an important contact, parameters of that contact's record and usage of that record are gathered and analyzed. For instance, parameters that may be of interest can include the frequency with which that contact is called or sent text messages. Based on aggregated data from a multitude of owners the following exemplary rule may be defined:

IF the number of calls and/or number of SMSs is more than <preset threshold>, THEN the contact is important.

In various embodiments, in assessing the importance of applications at the server side where the databases are maintained, data mining techniques are utilized. For example, in the case of database of applications 430, clustering analysis is employed to assign an application to an already-known group based on certain attributes of the application. Accordingly, applications having their own built-in security features, such as encryption facilities, authentication at startup, support for certain protected file formats for storage, etc., are deemed to be associated with sensitive data, and should be classified as important. Likewise, classification or associated rule mining techniques, which are well-known in the art, may me applied to assess importance of known data items (or types of known data items).

In another example, artificial neural networks (ANNs) are utilized to assess the importance of files. The information in the form of metadata about the files, such as: name and file type, size, location on the disk, etc., can be fed to the input layer of the ANN. After obtaining all the necessary input data, the result of the final value importance for the file is received from the output layer of the ANN.

It should be understood that other techniques for assessment of importance of applications, files, contacts, and other potentially important information on the mobile device, may be utilized within the scope of the invention. For instance, expert system techniques, or more simple if-then relationships may be applied. Various weighting and multivariate analysis techniques may be applied in appropriate circumstances.

In one embodiment, a system of fuzzy logic is employed to work with data in application database 430, database of file assessment 460 and database of contact assessment 490, for more correct assessment. The system of fuzzy logic involves three stages:

1. Fuzzification—the introduction of fuzziness.

To perform this operation for all input variables, linguistic variables are defined, each linguistic variable being formed by a term set. For each term, a membership function is constructed. For example, for the linguistic variable "number of messages associated with contact" the term set will have the form {"few", "little", "a moderate amount", "a lot"}, which allows one to move away from a specific numerical values.

2. Creating and using a fuzzy knowledge base.

The fuzzy knowledge base includes production rules of the form IF <premise of the rule, then <conclusion of the rule>. For example, one can use the following rule: "If the number of messages associated with contact is <a lot>, the importance of the contact <high>". The construction of such rules is usually straightforward, as they are understood and are a kind of verbal encoding.

3. Defuzzification—getting a clear numerical value from the output, which in this case, is the assessment of the importance of the data.

The system of fuzzy logic according to this type of embodiment it provides flexibly to take into account many different characteristics of the mobile device's data.

Figure 6:
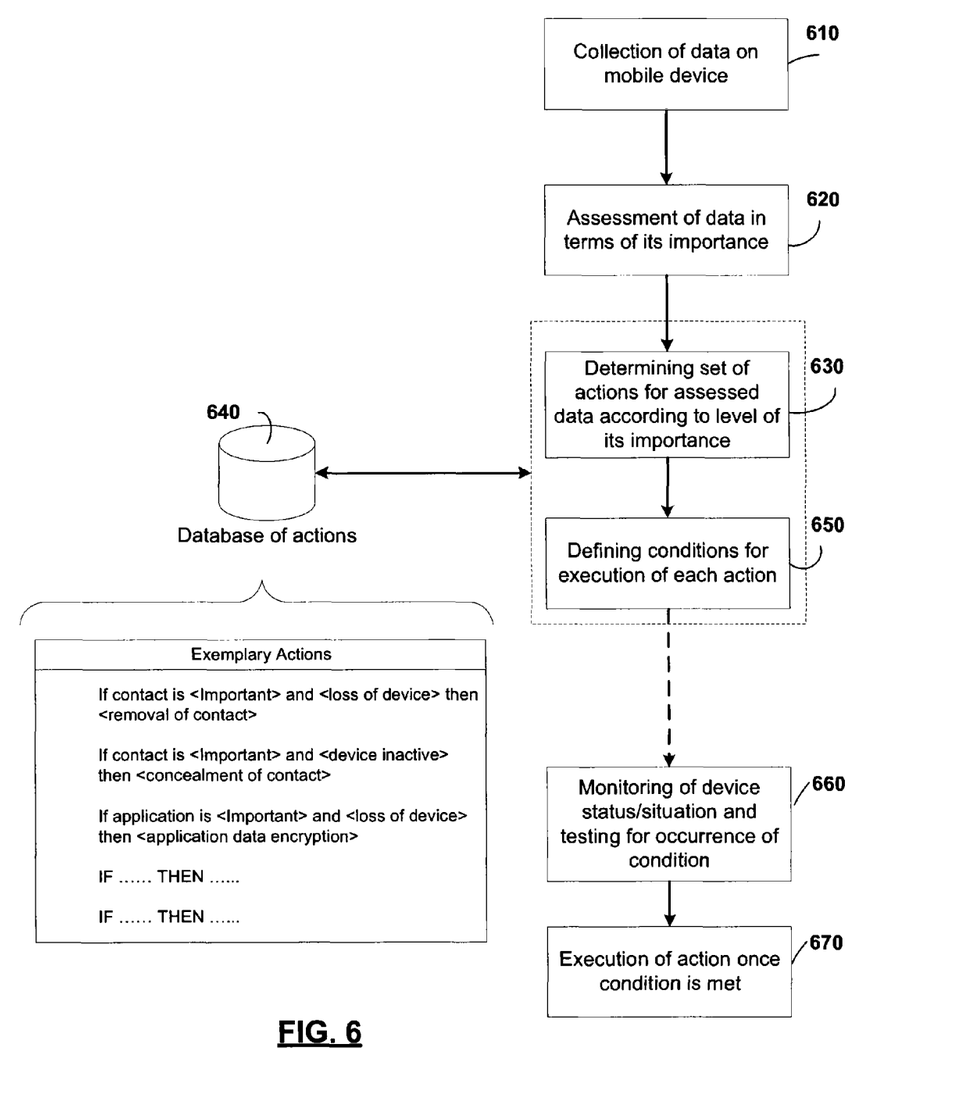
FIG. 6 is a flow diagram illustrating a process implementing a protection scheme according to one embodiment of the invention.

FIG. 6 is a flow diagram illustrating a process of preparing for, and responding to, a loss or theft of a mobile device by preventing access to important data items on the mobile device according to an example embodiment. Blocks 610-650 relate to preparing the mobile device to respond if a situation warranting a response arises (including configuring the device to recognize responsive action-triggering conditions). This portion of the process can be carried out as a background process during a time when the mobile device would otherwise be idle so as not to burden the device's computing capacity. Blocks 660-670 relate to actually detecting the need to respond, and responding according to the preparations made in the earlier blocks. This portion of the process may be elevated to a preeminent priority in lieu of other programs or activities of the mobile device.

At block 610 data is collected on the mobile device about the applications and their associated data, files in the file system of the device or on removable media, contacts, and other data on the mobile device, along with usage information of those objects by the owner of the mobile device (or by programs operating on behalf of the owner).

At 620, the importance of those various objects is evaluated as described above with reference to FIG. 4. In one example implementation, the importance determination is performed on the mobile device using one or more remotely-maintained databases of applications, file assessment rules, and contact assessment rules. This approach saves the mobile device from having to store and update vast local databases. This approach also avoids having to send important or sensitive data items to a third party for analysis.

Next, a set of actions to be taken to secure the data items on the mobile device is determined, and stored on the mobile device at block 630. The actions to be taken will vary according to an assessed situation of the mobile device. Various observable indicia is associated with types of situations to be detected. For example, detectable situations may be indicated by a prolonged lack of user input activity of the mobile device (for example, when an owner leaves their mobile device at home and doesn't use it for some significant amount time), by repeated failure to enter a screen unlock pattern (suggesting an unauthorized user is attempting to gain access to the device), received SMS messages having particular codes (such as those generated by a security service), a known pattern of operation previously associated with activity of known malware types (suggesting a presence of an infection), and the like. If the owner of the device realizes that the device has been lost/mislaid or stolen, the owner may attempt to inform the device of this fact using security services (which in turn may send SMS or system-level messages to the device). Other indicia may suggest a variety of other situations for which specific actions are to be taken.

Possible actions determinable for a given situation include, without limitation, removal (i.e., irretrievable deletion) of certain data items, encryption of data items, hiding or otherwise obfuscating the data items, and backing up of data items.

Database of actions 640 is used to store the actions to take in response to predefined conditions. In one example implementation, as illustrated in FIG. 6, such a database can store relationships of condition-action in the format of production rules: IF <premise>, THEN <rule to be applied>. For example, one rule can be defined in this form: "IF the contact is important AND the device is disabled, THEN conceal that contact" Thus, defining a set of actions for the evaluated data, depending on their importance at 630, can be done by a comparator module. Likewise, reaction rules may be utilized where appropriate. In one particular type of embodiment, database of actions 640 resides locally on the mobile device. In another embodiment, database of actions 640 is maintained remotely by a security provider, and is employed as a knowledge base from which default conditions/actions may be configured into a small local database or rule set, which resides on the mobile device. In this type of embodiment, the local storage of database of actions 640 ensures that the actions may be called out and taken in response to a detected condition meeting the criteria of the predefined conditions for which actions are to be taken, without requiring a network connection to a security server.

Conditions for triggering actions are defined in advance. Defining the conditions may be performed either manually, or by reference SMS, for example. Additionally, the parameters associated with the device itself (for example, determining the duration of user inactivity or determining whether the SIM card has been swapped) are taken into account. Formation of these conditions occurs at 650 and can be done either automatically (e.g., writing code for each action), using a knowledge base embodiment of database of actions 640, and can also be manually edited by the user through a user interface.

At 660, the mobile device monitors itself for any indicia from which a device situation can be inferred. This monitoring action can be performed periodically at a preset interval, or in response to certain events or non-events. For instance, a monitoring cycle may be initiated in response to the mobile device having remained idle (i.e. lack of user interaction) for some predetermined period of time. The indicia or situational inference is tested against the predefined set of conditions, which were defined at 650. If any such condition is met, at 670 the process executes action(s) corresponding to the satisfied condition.

In one embodiment, the actions carried out at 670 are carried out at an utmost priority relative to other processes that may be running on the mobile device at the time. In a related embodiment, the actions are prioritized to have priority over any user-originated command, such as any command entered via the user interface, but not necessarily over system-level processes, which may be deemed necessary to ensure stability of the operating system of the mobile device 20. In another related embodiment, during execution of the actions at 670, user input devices are suspended to prevent a malicious actor from accessing or destroying important data while the important data is being secured.

In a more sophisticated approach, a faux user interface is displayed to the user of mobile device 20 in which some basic functionality is permitted but important data and applications that access important data are hidden and inaccessible. This approach tends to obfuscate the operation of the data protection system from the potentially malicious user in order to avoid leading the user to suspect the existence of important data. The faux user interface can allow access to certain games, non-critical media, and certain applications. In one embodiment, limited access to telephone functionality is also provided by the faux user interface. Such limited access may exclude connections that would result in charges; also, limited telephone access may limit voice calls to one or two minutes before cutting the call off. In a related embodiment, the faux user interface feigns a weak signal as a reason for cut-off calls. Similarly, the faux user interface can give the appearance that SMS messages were sent, but instead actually fails to send any SMS messages.

In one embodiment, a first prioritization scheme is utilized for selecting actions to take based on a determined device situation, device status, or other condition of mobile device 20. Thus, for example, if mobile device 20 is determined to be stolen, then more drastic action is called for, such as immediate removal of sensitive data. If, on the other hand, the device is determined to be misplaced, then a relatively less drastic measure may be employed, such as encryption of sensitive data items.

In a related embodiment, a second prioritization scheme is used for selecting actions to take based on a determined computing capacity availability (memory availability, processor availability, battery discharge state). Thus, for instance, in the case of a low battery indication, a more energy-efficient process for deleting index entries to, or otherwise concealing, sensitive data may be called for compared to a more energy-intensive (albeit more secure) process of encrypting or overwriting the sensitive data. In one embodiment, the first and the second prioritization schemes are defined and stored in a section of database of actions 640.

The first and the second prioritization schemes may be at odds with one another. For example, if the determined condition-based prioritization calls for drastic action to be taken to prevent the compromise of sensitive data, but the battery of the device is critically low, the computing capacity-based prioritization may require less drastic action to ensure that at least some minimum protection of the sensitive data is carried out before the battery runs out completely. Accordingly, in a related embodiment, the first and the second prioritization schemes are merged as a single prioritization scheme that has multiple input variables, including device condition, and device computing capacity.

In addition, prioritization may be further focused based on criticality of data items. Thus, for example, more sensitive, or more critical, data items are given ordered priority, strength-of-protection priority, or both. Ordered priority relates to the order in which data items (or classes of data items) are protected (relative to other data items) in response to a call for taking protective action, with more critical data items being protected first. Strength-of-protection priority relates to the protective action that is associated with certain data items. Strength-of-protection priority can be defined for classes of data items, or for individual ones. Strength-of-protection priority can be defined in terms of minimum level of protection (e.g., data item class X must be either encrypted or irretrievably deleted to be protected). Additionally, strength-of-protection priority can be defined in terms of severity of condition (e.g., for a determined condition of device inactive for predefined period of time, data item class X must be at least encrypted AND for a determined condition of device stolen, data item class X must be irretrievably deleted).

In one embodiment, a single prioritization scheme is employed including the multiple input variables of device situation, device computing capacity, criticality-based ordered priority, strength-of-protection priority. In one implementation, each input variable is associated with a weight, and each input variable value is represented with a numerical indication of degree. For a given device situation, computing capacity, and data item priority definitions, the actions to be taken, and their ordering, can thus be determined computationally. A fuzzy logic implementation is utilized in another type of embodiment.

In yet another embodiment, mobile device 20 stores a lookup table with clearly defined actions in response to certain combinations of input variable values. The table can be defined by a security service provider using either the classical or fuzzy logic computational methods discussed above, for instance, and the results of the multiple computations are stored locally in mobile device 20 to be looked up quickly (without burdening the device for conducting the computation in response to a device condition meeting the criteria calling for action).

Figure 7:
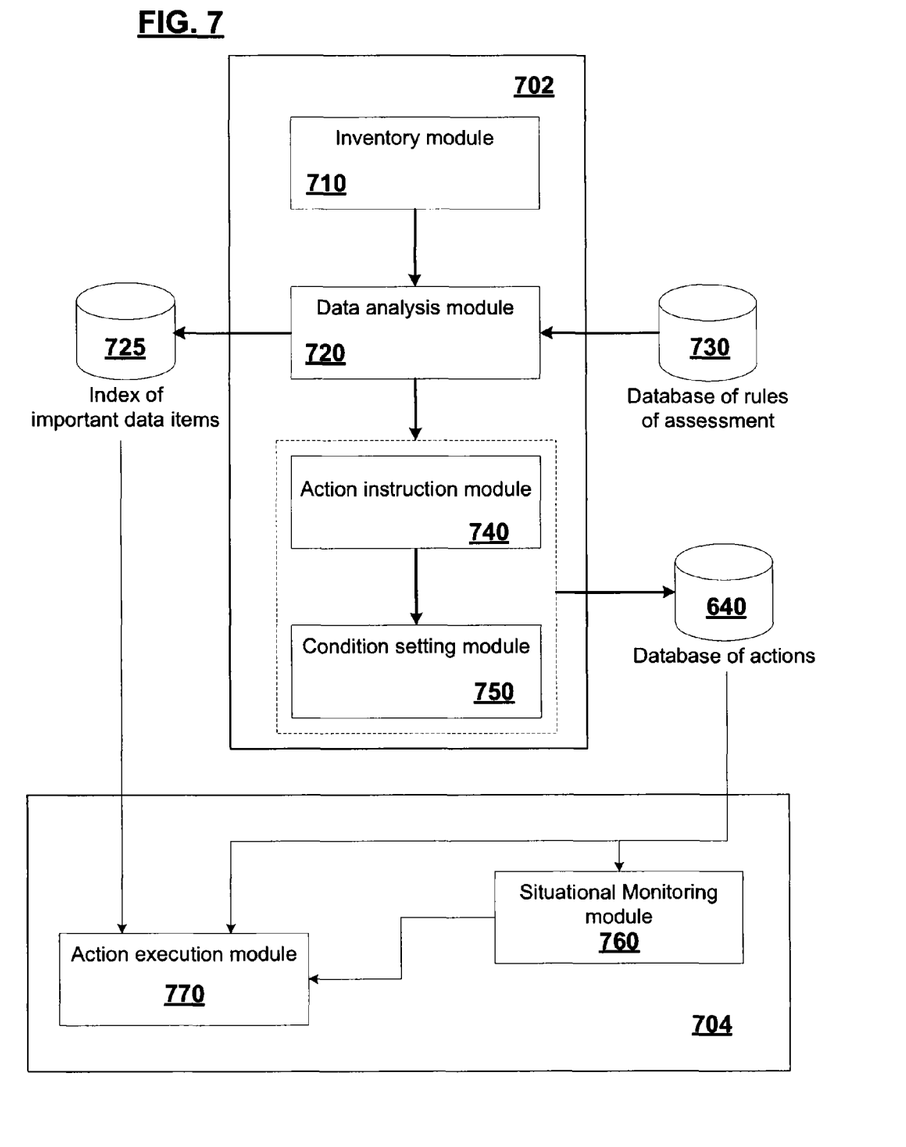
FIG. 7 is a diagram illustrating a system having a set of modules with which aspects of the invention may be realized according to one type of embodiment.

FIG. 7 is a block diagram illustrating an exemplary system of modules that implements data protection readiness and responsiveness on a mobile device according to one embodiment. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more mobile devices (such as the one described in greater detail above with reference to FIG. 1) that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

In the system of FIG. 7, the modules are implemented on a mobile device, unless otherwise indicated in particular embodiments. In the embodiment depicted, there are two general modules: preparation module 702, and protection module 704. Preparation module 702 runs during periods of low utilization of mobile device 20 by its user or other processes, and during times of relatively high computing capacity availability, e.g., when the power system is connected to external power or when the device is idling and the battery is in a relatively charged state (>50% for instance). In one embodiment, preparation module 702 determines a current state of computing availability (based on one or more parameters, e.g. processor load, memory usage, battery capacity, etc.) and compares that state to a threshold level of computing availability. If the comparison indicates a level of availability which is greater than the threshold, the mobile device is deemed to be available for operation of preparation module 702.

Preparation module 702 is responsible for performing pre-processing on the mobile device to prepare the mobile device for data protection readiness. Data protection readiness means that mobile device 20 is set to be able to detect and respond to situations or circumstances in which the occurrence of data loss or privacy breach has an increased likelihood, such as misplacement or theft of the device. Preparation module 702 in one embodiment includes inventory module 710, data analysis module 720, action instruction module 740, and condition setting module 750.

Protection module 704 is responsible for monitoring the activity or inactivity of mobile device 20 and detecting the situation or circumstances for which a data protection response is called for. The response involves taking computationally efficient actions by mobile device 20 to quickly secure, remove, or hide sensitive or important data, preferably before the loss or privacy violation can take place. The monitoring and responding is made computationally efficient because it is based on preparations previously made by preparation module 702. Protection module 704 in one embodiment includes situational monitoring module 760 and action execution module 770.

Inventory module 710 collects information about data stored on the mobile device including, but not limited to, contacts, applications, files on the mobile device, and the like. In one embodiment, inventory module 710 causes the computing system of the mobile device to The collected information can be stored in any suitable format, such as an index to each data item's location in the file system, for example. The output of inventory module 710 is read by data analysis module 720, which is configured to evaluate each data item in terms of its importance to the owner, using a technique such as the one described above with reference to FIG. 4.

Database of rules of assessment 730, which in one embodiment is hosted remotely from the mobile device, contains a knowledge base that is used by data analysis module to assess importance of data items. In one embodiment, database of rules of assessment 730 comprises one or more of databases 430, 460, 490 (FIGS. 5A-5C). The output of data analysis module 720 is an index of important data items 725, which identifies is a subset of all of the data items collected by inventory module 710 which are important. In various embodiments, one or more levels of importance are designated, such as "generally important," "particularly important," or "critical," for example.

Action instruction module 740 and condition setting module 750 respectively identify protective actions to be taken to protect important data, and the conditions in response to which such actions are triggered. The product of these modules is stored in database of actions 640, discussed above with reference to FIG. 6.

In one variation of this embodiment, a user interface is provided via mobile device 20 that facilitates customization of database of actions 640. In one such approach, the user is presented with default conditions and associated rules, and is provided with options for appending additional conditions or rules, or changing the defaults.

In one embodiment, the determination of default protective actions, and conditions and associated rules is performed remotely from mobile device 20, such as by a security services provider's server. In another embodiment, the determination of the default protective actions, conditions and rules is handled locally on the mobile device.

Situational monitoring module 760 causes the mobile device to watch for, and detect a situation for which one or more conditions are defined. Situational monitoring module 760 monitors activity or inactivity and state information of mobile device 20, including, for example, user interface input activity, GPS or accelerometer indicia, if available, messaging activity, voice call activity, and the like. Situational monitoring module 760 reads database of actions 640 to obtain the condition criteria. Upon detection of occurrence of such condition(s), control is passed to action execution module 770, which looks up the actions to take for the detected conditions in database of actions 640, and applies those actions to the important data items pointed to by index of important data items 725. Action execution module 770, in certain embodiments, coordinates the prioritization and overriding of other mobile device functions described above as part of implementing the protection of important data items. In embodiments in which a faux user interface is employed, action execution module 770 includes a user interface module that is configured to coordinate functionality of the faux user interface. Additionally, in embodiments utilizing prioritization among protective actions, action execution module 770 includes an action prioritization module that implements the prioritization techniques described above.

Accordingly, data items, which are specifically important to the owner of the mobile device, are secured in response to a detected situation in which the mobile device is believed to be at particular risk for data loss or exposure of sensitive data. The actions taken to secure the important data items are based on the nature of the situation of the mobile device, the nature of the data item, the importance of the data item to the owner, the operational status and computational capacity of the mobile device, and other configurable parameters. This approach is particularly well-suited to individual mobile devices since the bulk of the processing for enabling the important data to be secured is performed in advance, and with the benefit of externally-managed and up-to-date knowledge base(s) of general importance-determining criteria and data securing best practices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A mobile device configurable for data protection readiness, comprising:
 a computing system that includes a power system having an on-board energy source, and a processor operatively coupled with a data storage arrangement and a network interface, the computing system further including:
  a preparation module configured to perform preprocessing to prepare the mobile device for data protection readiness, the preprocessing to be performed autonomously prior to an occurrence of a situation for which the items of data of personal importance are to be secured, and including:
   computationally determining, from among data stored in the data storage arrangement, certain items of data which are of personal importance to an owner of the mobile device based on a rule set that evaluates an extent of use on the mobile device, by the owner, of applications associated with those data items, wherein different ones of those certain items of data are associated with corresponding different levels of importance;
indicating criteria that defines the situation for which the items of data of personal importance are to be secured; and
indicating a set of actions to be autonomously carried out to secure the items of data of personal importance, wherein the set of actions includes different protective actions associated with corresponding different levels of importance of the data items; and
a protection module configured to autonomously monitor for an occurrence of the situation for which the items of data of personal importance are to be secured based on the criteria indicated by the preparation module, and to execute the set of actions indicated by the preparation module in response to a detection of the occurrence of the situation.

2. The mobile device of claim 1, wherein the preparation module is configured to perform the preprocessing during a time period of relatively high computing availability.

3. The mobile device of claim 1, wherein the preparation module includes:
an inventory module configured to collect information about data stored in the data storage arrangement; and
a data analysis module configured to analyze the information collected by the inventory module to identify those certain items of data that are of personal importance to an owner of the mobile device, based on a managed set of assessment rules.

4. The mobile device of claim 3, wherein the data analysis module is configured to access a database of rules of assessment that contains a knowledge base for use by the data analysis module to assess whether data items stored in the storage arrangement are data items of personal importance to the user of the mobile device.

5. The mobile device of claim 4, wherein at least a portion of the database of rules of assessment is hosted remotely from the mobile device.

6. The mobile device of claim 4, wherein at least a portion of the database of rules of assessment is hosted locally on the mobile device.

7. The mobile device of claim 4, wherein at least a portion of the database of rules of assessment includes a linguistic description of rules.

8. The mobile device of claim 4, wherein the preparation module includes an interactive user interface module adapted to facilitate establishing or adjusting importance-determination rules of the database of rules of assessment.

9. The mobile device of claim 4, wherein the database of rules of assessment includes a database of applications that contains at least information identifying a plurality of known application programs and, for each of those identified application programs, data used by that application program.

10. The mobile device of claim 9, wherein the database of applications includes owner-specific information about installed applications.

11. The mobile device of claim 4, wherein the database of rules of assessment includes a database of file assessment that contains at least an inventory of files stored in the data storage arrangement.

12. The mobile device of claim 11, wherein the database of file assessment includes a set of rules for assessing a level of personal importance to the owner of the files represented in the inventory of files.

13. The mobile device of claim 4, wherein the database of rules of assessment includes a database of contact assessment containing parameters relating to usage of each contact by the owner.

14. The mobile device of claim 1, wherein the preparation module includes:
an action instruction module configured to indicate protective actions to be taken by the computing system to protect each of the items of data of personal importance.

15. The mobile device of claim 14, wherein the preparation module includes:
a condition setting module configured to indicate situational conditions in response to which the protective actions are to be taken.

16. The mobile device of claim 1, wherein the protection module includes:
a situational monitoring module configured to monitor activity/inactivity and state information of the mobile device to detect a situation based on the criteria that defines a situation; and
an action execution module configured, in response to a detection by the situational monitoring module of the situation, to carry out at least one action of the set of actions.

17. The mobile device of claim 16, wherein the action execution module is configured to implement at least one prioritization scheme for selecting actions to take, wherein the at least one prioritization scheme is selected from the group consisting of: device situation-based prioritization, device computing capacity-based prioritization, criticality-based ordering prioritization, strength-of-protection-based prioritization, or any combination thereof.

18. A method for preparing a mobile device for data protection readiness, comprising:
(a) storing instructions in the mobile device for causing the mobile device to (i) autonomously determine, from among data stored on the mobile device, certain items of data which are of personal importance to an owner of the mobile device based on a rule set that computationally evaluates an extent of use on the mobile device, by the owner, of applications associated with those data items, wherein different ones of those certain items of data are associated with corresponding different levels of importance;
(b) storing instructions in the mobile device for causing the mobile device to (ii) autonomously indicate criteria that defines a situation for which the items of data of personal importance are to be secured;
(c) storing instructions in the mobile device for causing the mobile device to (iii) autonomously indicate a set of actions to be carried out to secure the items of data of personal importance, wherein the set of actions includes different protective actions associated with corresponding different levels of importance of the data items;
(d) storing instructions in the mobile device for causing the mobile device to (iv) autonomously monitor for an occurrence of the situation for which the items of data of personal importance are to be secured based on the criteria; and
(e) storing instructions in the mobile device for causing the mobile device to (v) autonomously execute the set of actions in response to a detection of the occurrence of the situation,
wherein storing the instructions in (a)-(c) causes the mobile device to perform (i)-(iii) prior to performing (iv) and (v).

19. The mobile device of claim 1, wherein the protection module is further configured to execute, in response to the detection of the occurrence of the situation, a faux user interface that provides certain limited functionality of the mobile device while preventing access to the items of data of personal importance.

20. The method of claim 18, wherein storing the instructions in (a)-(c) includes storing instructions in the mobile device to configure the mobile device to perform (i)-(iii) during a time period of relatively high computing availability of the mobile device.

21. The method of claim 18, wherein (a) includes:
(vi) storing instructions in the mobile device for causing the mobile device to collect information about data stored on the mobile device; and
(vii) storing instructions in the mobile device to analyze the information collected in (vi) to identify those certain items of data that are of personal importance to an owner of the mobile device, based on a managed set of assessment rules.

22. The method of claim 21, wherein (vi) includes storing instructions in the mobile device for causing the mobile device to access a database of rules of assessment that contains a knowledge base for use by the mobile device to assess whether data items stored in the mobile device are data items of personal importance to the user of the mobile device.

23. The method of claim 22, wherein storing instructions in the mobile device for causing the mobile device to access a database of rules of assessment includes configuring the mobile device to access a database of applications that contains at least information identifying a plurality of known application programs and, for each of those identified application programs, data used by that application program.

24. The method of claim 22, wherein storing instructions in the mobile device for causing the mobile device to access a database of rules of assessment includes configuring the mobile device to access a database of file assessment that contains at least an inventory of files stored on the mobile device.

25. The method of claim 22, wherein storing instructions in the mobile device for causing the mobile device to access a database of rules of assessment includes configuring the mobile device to access a database of contact assessment containing parameters relating to usage of each contact by the owner.

26. The method of claim 18, wherein (e) includes storing instructions in the mobile device for causing the mobile device to implement at least one prioritization scheme for selecting actions to take, wherein the at least one prioritization scheme is selected from the group consisting of: device situation-based prioritization, device computing capacity-based prioritization, criticality-based ordering prioritization, strength-of-protection-based prioritization, or any combination thereof.

27. The method of claim 18, wherein (e) includes storing instructions in the mobile device for causing the mobile device to implement, in response to the detection of the occurrence of the situation, a faux user interface that provides certain limited functionality of the mobile device while preventing access to the items of data of personal importance.

28. A non-transitory computer-readable storage medium containing instructions for preparing a mobile device for data protection readiness, comprising:
instructions for causing the mobile device to (i) determine, from among data stored on the mobile device, certain items of data which are of personal importance to an owner of the mobile device based on a rule set that evaluates an extent of use on the mobile device, by the owner, of applications associated with those data items, wherein different ones of those certain items of data are associated with corresponding different levels of importance;
instructions for causing the mobile device to (ii) indicate criteria that defines a situation for which the items of data of personal importance are to be secured;
instructions for causing the mobile device to (iii) indicate a set of actions to be carried out to secure the items of data of personal importance, wherein the set of actions includes different protective actions associated with corresponding different levels of importance of the data items;
instructions for causing the mobile device to (iv) monitor for an occurrence of the situation for which the items of data of personal importance are to be secured based on the criteria; and
instructions for causing the mobile device to (v) execute the set of actions in response to a detection of the occurrence of the situation;
wherein the instructions for causing the mobile device to perform (i)-(iii) cause the mobile device to perform (i)-(iii) prior to performing (iv) and (v).

* * * * *